United States Patent Office 2,722,497
Patented Nov. 1, 1955

2,722,497

PESTICIDAL COMPOSITIONS AND THEIR USE

Jack S. Newcomer, Grand Island, N. Y., assignor, by mesne assignments, to The Pennsylvania Salt Manufacturing Company, Philadelphia, Pa., a corporation of Pennsylvania No Drawing. Application May 21, 1951,
Serial No. 227,525

13 Claims. (Cl. 167—30)

The present invention pertains to pest control, and to methods and compositions for protecting materials, particularly organic materials, against attack by pests. More particularly, the invention pertains to new compositions which are employed in the control of pests, such as fungi, bacteria, and insects. Still more particularly, the invention pertains to compounds which are extremely effective agents for killing microorganisms, said compounds being monocyclic, unsaturated, five-menbered, carbocyclic compounds containing one or more (such as from one to four) chlorine atoms, at least one of which is in "doubly allylic" position with respect to two activating, unsaturated groupings, one of which is the carbonyl grouping, and the other of which is one of the group consisting of the carbonyl grouping, the carbimino grouping, and the vinyl-type grouping. Other chlorine atoms which are singly allylic or non allylic may also be present.

It is an object of this invention to provide compositions of outstanding value in protecting organic material, both in the natural and artificial state, said compositions being highly effective in controlling economically harmful pests which attack organic material. A further object of the invention is to provide pesticidal compositions which contain, as essential active ingredients, certain carbocyclic compounds having doubly allylic chlorine. A still further object is to provide compositions which are highly effective, at very low concentrations of active ingredient, in killing microorganisms or preventing or inhibiting their growth. Another object of the invention is to treat agricultural materials, whether in the natural or fabricated state, with certain carbocyclic compounds having doubly allylic chlorine, thereby both disinfecting and preserving such agricultural materials. These objects and others will be apparent from this specification.

During the course of my researches on evaluating the pesticidal effectiveness of a wide variety of chlorinated organic compounds, I have discovered a surprising correlation between pesticidal potency, and the location of one or more selected chlorine atoms within the molecule with respect to certain groupings. I find that monocyclic, unsaturated, five-membered, carbocyclic compounds containing one or more chlorine atoms which are doubly allylic with respect to certain selected groupings are markedly more effective as pesticides than are, for example, similar compounds containing chlorine atoms but devoid of this structural feature. The presence of one doubly allylic chlorine atom in compounds as above described confers a high degree of pesticidal activity to such compounds, and the presence in such compounds of more than one such chlorine atom does no harm, and often is quite beneficial.

For the purposes of this invention, by the term "doubly allylic chlorine atom" is meant a chlorine atom attached to a carbon atom, which in turn is directly attached to two unsaturated groupings. This molecular fragment in the present invention may be designated as follows:

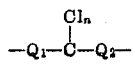

wherein C is a nuclear carbon atom; wherein $n$ represents an integer from 1 to 2; wherein $Q_1$ represents =C=O (the carbonyl grouping); and wherein $Q_2$ represents an unsaturated grouping selected from the class consisting of =C=O (carbonyl),

(vinyl type, such as vinylidene and vinylene), and =C=NH (carbimino) groupings. Thus $Q_1$ and $Q_2$ may represent two =C=O groupings, or one =C=O grouping and one

grouping, or one =C=O grouping and one =C=NH grouping. The unsaturated groupings, it will be observed, are directly attached to a chloro- or dichloromethylene radical, the carbon atom of which is nuclear.

In the practice of the invention there is applied to the material which is to be protected against attack by pests, a composition containing as an essential active ingredient, one or more compounds as above described.

In the case of the vinyl-type grouping, the remaining valences may be satisfied by substituents other than hydrogen if desired, such as chlorine; alkyl such as methyl, ethyl, propyl, and butyl, including isomeric forms thereof; mono- or poly-chlorinated alkyl such as chloromethyl, dichloromethyl, trichloromethyl, chloroethyl, dichloroethyl, trichloroethyl, chloropropyl, heptachloropropyl, chlorobutyl, and tetrachlorobutyl, including isomeric forms thereof; alkenyl such as vinyl, allyl, and crotyl; mono- or poly-chlorinated alkenyl such as chlorovinyl, trichlorovinyl, chloroallyl, trichloroallyl, chlorocrotyl, and pentachlorocrotyl, including isomeric forms thereof; alkylidene such as methylene, ethylidene, propylidene, and butylidene, including isomeric forms thereof; and mono- and poly-chlorinated alkylidene such as chloromethylene, dichloromethylene, chloroethylidene, dichloroethylidene, chloropropylidene, trichloropropylidene, chlorobutylidene, and tetrachlorobutylidene, including isomeric forms thereof, etc. The same applies to other remaining valences on the five-membered carbocyclic ring which are not a part of the molecular fragment as defined herein. In the latter case remaining valences may also be satisfied by oxygen.

Examples of active ingredients of the invention are given in Table 1.

TABLE 1

Two carbonyl groupings:
  Tetrachloro-4-cyclopentene-1,3-dione
  2,5-dichloro-4-cyclopentene-1,3-dione
  2,2,5-trichloro-4-cyclopentene-1,3-dione
One carbonyl grouping, one vinyl-type grouping:
  Hexachloro-3-cyclopentene-1-one
  3,4,5-trichloro-3-cyclopentene-1,2-dione
  3,4,5,5-tetrachloro-3-cyclopentene-1,2-dione
  2,2,3,4,5-pentachloro-5-methyl-3-cyclopentene-1-one
  2,2,3,5,5-pentachloro-4-methyl-3-cyclopentene-1-one
  2,2,4,5 - tetrachloro - 3,5-dimethyl-3-cyclopentene-1-one
  2,2,4,5 - tetrachloro - 3,5-bis(chloromethyl)-3-cyclopentene-1-one
  2,2,3,4,5 - pentachloro - 5 - (chloromethyl)-3-cyclopentene-1-one
One carbonyl grouping, one carbimino grouping:
  2,5-dichloro-4-cyclopentene-3-imine-1-one
  2,2,4,5-tetrachloro-4-cyclopentene-3-imine-1-one
  2,2,5-trichloro-4-cyclopentene-3-imine-1-one Methods for the preparation of the active ingredients are disclosed in literature references as follows: Zincke and Rabinowitsch, Ber. 24, 916 (1891); Zincke, Ber. 26, 517 (1893); Zincke and Kuster, Ber. 21, 2719 (1888); Prins, Rec. trav. chim. 65, 455–67 (1946); Prenntzell, Ann. 296, 192 (1897); Bergmann and Francke, Ann. 296, 167 (1897); Francke, Ann. 296, 209 (1897); Zincke and Fuchs, Ber. 26, 1671 (1893); Zincke and Fuchs, Ber. 26, 1676 (1893).

Within the broad scope of my active ingredients as above defined, one class is preferred, namely, the class of active ingredients characterized by the presence of one carbonyl grouping and one vinyl-type grouping. The active ingredients of this class, which like all the active ingredients of this invention are very effective pesticides, are relatively easy to prepare and in addition are relatively non-toxic to living plants. The latter property is of no significance when my compositions are used to protect non-living matter, for example, leather, hides, paper, cork, wood, cotton fabrics, cordage and other cellulosic manufactured products, ink, proteinaceous materials such as wool, gelatin, glue, casein, zein, soybean meal, etc. It is of significance, however, when my compositions are used to protect living plants, including the seeds thereof, against the ravages of microorganisms.

The powerful pesticidal properties of the active ingredients of this invention are shown in the following examples, which are by way of illustration and not of limitation.

In the examples, concentrations of the active ingredients are expressed as parts by weight.

*Example 1*

Representative compounds of the invention were evaluated as fungicides by the slide-spore germination procedure, in which the percentage of inhibition of spore germination is determined after a specified incubation period. These tests were conducted in accordance with the American Phytopathological Society method, except that they were continued for three days instead of only one day. The microorganisms employed were the brown peach-rot fungus (*Sclerotinia fructicola*) and the apple bitter-rot fungus (*Glomerella cingulata*). These organisms are typical of those which cause some of the major and difficultly controlled plant diseases.

The data obtained are given in Table 2, from which it can be seen that the compounds of the invention are very potent fungicides. For purposes of identification in the table, compounds having the structures indicated below will bear letter designations as follows:

A. 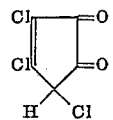

3,4,5-trichloro-3-cyclopentene-1,2-dione

B. 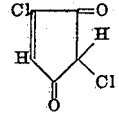

2,5-dichloro-4-cyclopentene-1,3-dione

C. 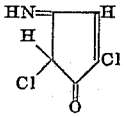

2,5-dichloro-4-cyclopentene-3-imine-1-one

D. 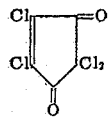

tetrachloro-4-cyclopentene-1,3-dione

E. 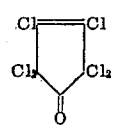

hexachloro-3-cyclopentene-1-one

TABLE 2

| Active ingredient | Formulation | Incubation period, days | Inhibition of Spores, Percent ||||||
|---|---|---|---|---|---|---|---|---|
| | | | *Sclerotinia fructicola* ||| *Glomerella cingulata* |||
| | | | Conc. of active ingredient ||| Conc. of active ingredient |||
| | | | 1 p. p. m. | 10 p. p. m. | 100 p. p. m. | 1 p. p. m. | 10 p. p. m. | 100 p. p. m. |
| Water (control) | | 1 | 0 | 0 | 0 | 0 | 0 | 0 |
| | | 2 | 0 | 0 | 0 | 0 | 0 | 0 |
| | | 3 | 0 | 0 | 0 | 0 | 0 | 0 |
| Chloranil (commercial fungicide). | Water emulsion | 1 | 0 | 0 | 100 | 0 | 0 | 100 |
| | | 2 | 0 | 0 | 100 | 0 | 0 | 100 |
| | | 3 | 0 | 0 | 100 | 0 | 0 | 100 |
| A | do | 1 | 0 | 98 | 100 | 0 | 100 | 100 |
| | | 2 | 0 | 98 | 100 | 0 | 100 | 100 |
| | | 3 | 0 | 98 | 100 | 0 | 100 | 100 |
| B | Water solution | 1 | 100 | 100 | 100 | 100 | 100 | 100 |
| | | 2 | 100 | 100 | 100 | 100 | 100 | 100 |
| | | 3 | 100 | 100 | 100 | 100 | 100 | 100 |
| C | Water emulsion | 1 | 0 | 100 | 100 | 0 | 0 | 100 |
| | | 2 | 0 | 100 | 100 | 0 | 0 | 100 |
| | | 3 | 0 | 100 | 100 | 0 | 0 | 100 |
| D | do | 1 | 0 | 0 | 15 | 0 | 0 | 100 |
| | | 2 | 0 | 0 | 0 | 0 | 0 | 75 |
| | | 3 | 0 | 0 | 0 | 0 | 0 | 75 |
| E | do | 1 | 0 | 0 | 100 | 0 | 0 | 100 |
| | | 2 | 0 | 0 | 100 | 0 | 0 | 100 |
| | | 3 | 0 | 0 | 100 | 0 | 0 | 100 |

The water emulsions of the above compounds were prepared with the aid of a surface-active agent, e. g., soap.

*Example 2*

The efficacy of 2,5-dichloro-4-cyclopentene-1,3-dione as an insecticide was demonstrated by applying dilute acetone solutions of the chemical to houseflies (*Musca domestica*). The standard drop-deposition method of evaluation was employed. The results were recorded 22 hours after treatment. It was found that 100% of the flies were dead when the above active ingredient was applied in concentrations as low as .1% in acetone. A control test conducted with acetone alone showed no flies dead or affected.

Example 3

Hexachloro-3-cyclopentene-1-one was tested against houseflies, using the procedure of Example 2. Results were noted 24 hours after treatment. It was observed that 80% of the flies were either dead or seriously affected when the above active ingredient was applied in concentrations as low as 0.5% in acetone. A control test conducted with acetone alone showed no flies dead or affected.

It is pointed out that any active ingredient of the invention may be substituted for the active ingredients of the above examples for pest control purposes, and that the specific pests employed are merely representative of pests against which my compositions may be used.

It will be understood that my active ingredients may be used individually or in admixtures with each other for the desired purposes.

The active ingredients of this invention may be applied in a variety of ways to materials which are to be protected against attack by microorganisms, such as by dusting, spraying, dipping, or tumbling, as best suits the protection problem at hand. They may be used as such in certain cases, but more frequently they are formulated with carriers before application. Carriers may be liquid, for example, water or certain oils, or solid, for example, any of the solid carriers or mixtures thereof more particularly referred to hereinafter.

Compositions may be formulated by mixing the active ingredients with any desired liquid or solid carriers, such as any of the finely divided solid carriers known in the dusting art, which are preferably of large surface area, such as clays, for example, fuller's earth, pyrophyllite, talc, bentonite, kieselguhr, diatomaceous earth, etc. Any of the commercial clays available on the market in finely divided form may be used, and particularly those which are normally employed as insecticide carriers. Commercial clays, it will be understood, are generally identified by trade names (reflecting the source and mode of processing), of which Homer clay, Celite, and Tripoli may be mentioned as typical.

Non-clay carriers which may be formulated with my active ingredients include, for example, sulfur, volcanic ash, lime products such as hydrated lime and calcium carbonate, by-product lignin, lignocellulose, flours such as wood, walnut shell, wheat, soybean, potato and cottonseed, or any other suitable material employed for similar purposes in the art.

Any desired formulation may be prepared by any suitable method. Thus the active ingredient, preferably in finely divided form if a solid, may be tumbled together with the carrier, or the carrier and the active ingredient may be ground together. Alternatively, the active ingredient in liquid form, including solutions, dispersions, emulsions, and suspensions thereof, may be admixed with the solid carrier in finely divided form in amounts small enough to preserve the free-flowing property of the final dust composition. If desired, excess liquid may be removed, such as by vaporization, for example, under reduced pressure.

When solid compositions are employed, in order to obtain a high degree of coverage with a minimum dosage of the formulation, it is desirable that the formulation be in finely divided form. Preferably, the dust containing the active ingreldient should be sufficiently fine that substantially all will pass through a 50 mesh sieve, and more particularly through a 200 mesh sieve. Appreciably larger particle size is less conducive to obtaining an economic application of the material; finer dusts, although they have excellent covering capacity, are somewhat more subject to drift and are more expensive to prepare.

For dusting purposes I prefer a formulation in which the active ingredient is present to the extent of say 10–50% by weight of the total. Such amounts normally give free-flowing products which dust easily. However, these concentrations are only indicative of ranges that give desirable qualities to dusting compositions, and formulations may be made with higher or lower active ingredient content. Thus, compositions containing between say 1% to 99% of active ingredient by weight are contemplated, the remainder being carrier and/or any other additive or adjuvant material which may be desired.

It is often advantageous to add small percentages of wetting agents to dust formulations, such as the wetting agents mentioned hereinafter.

For spray application the active ingredient may be dissolved or dispersed in a liquid carrier, such as water or other suitable liquid.

Aqueous solutions or dispersions are economical, and hence are frequently preferred. In general, the choice of the particular liquid carrier employed will be guided somewhat by prevailing circumstances, such as its availability, its solubility or dispersion characteristics toward the particular active ingredient, and in the case of the treatment of plants, by its toxicity to such plants. In general, water is an excellent liquid carrier, although in the case of the treatment of plants a relatively non-phytotoxic oil, such as diesel oil #2, may at times be preferred.

Thus, spray formulations comprising the active ingredient in the form of a solution, suspension, dispersion, or emulsion, in aqueous or non-aqueous media may be employed.

Emulsions or dispersions of the active ingredient in the liquid carrier may be prepared by agitation of the active ingredient with the carrier. In many instances this is done at the time of spraying. Preferably, however, the agitation should take place in the presence of an emulsifying or dispersing agent (surface-active agent), in order to facilitate the preparation of said emulsion or dispersion. Emulsifying or dispersing agents are well-known in the art, and include, for example, fatty alcohol sulfates, such as sodium lauryl sulfate, aliphatic or aromatic sulfonates, such as sulfonated castor oil or fish oil, or the various alkaryl sulfonates (such as the sodium salt of mono-sulfonated nonyl naphthalene or tertiary dodecyl benzene), or the soaps, such as sodium oleate and sodium stearate, or non-ionic types of emulsifying and dispersing agents such as the high molecular weight alkyl polyglycolethers or analogous thioethers such as the decyl, dodecyl, and tetradecyl polyglycolethers and thioethers containing from 25 to 75 carbon atoms. Such emulsifying and dispersing agents, it will be noted, also commonly possess wetting agent properties.

The use, if desired, of adjuvants, such as wetting agents and/or humectants, is also contemplated in connection with solutions, suspensions, dispersions, emulsions, or solid formulations of the active ingredient. Any suitable wetting agent and/or humectant may be employed for this purpose, such as the wetting agents more particularly referred to above.

Examples of humectants are glycerine, diethylene glycol, ethylene glycol, polyethylene glycols generally, and well-known sugars and sugar-containing mixtures, such as glucose, fructose, sucrose, dextrins such as white dextrin, canary dextrin, British gum, etc., honey, molasses, maple syrup, maple sugar, and starch syrups such as corn syrup, etc.

For adjuvant purposes, any desired quantity of wetting agent may be employed, such as up to 250% or more, based on active ingredient. For mere wetting purposes, the amount of adjuvant used may be considered to be that required to impart the desired wetting qualities to the spray solution as formulated, such as approximately 0.05% by weight of the spray solution. The use of considerably larger amounts is not based upon wetting properties, although present, but is a function of the physiological behavior of the wetting agent, these considerations being particularly applicable in the case of the treatment of plants.

It should be noted that after liquid formulations of my active ingredients have been applied to plants, the concentration of wetting agent existing upon such treated plants is in no sense a function of the concentration existing in the original formulation. Thus, evaporation might concentrate the wetting agent considerably, or the presence of dew on plant surfaces, or of plant juices on such surfaces might considerably dilute the wetting agent.

It will of course be understood that wetting agents, particularly when in solid form, may be compounded with solid forms of the active ingredient.

Although the active ingredients of this invention may be applied without dilution to materials which are to be protected against attack by microorganisms, it is usually desirable to employ liquid or solid formulations, for example, formulations such as those discussed above. In the case of liquid formulations, the active ingredient usually constitutes less than 30% by weight of the total, such as less than 10% and even as low as 0.1%.

Other substances than the carrier, surface-active agent, and/or humectant may be included in solid or liquid formulations of the active ingredients if desired, such other substances including spreaders, stickers, and other auxiliary materials. Active ingredients other than those disclosed herein and compatible with the formulation may be added if desired for any particular purpose. For example, it may at times be expedient to include singly or in combination, substances such as plant response agents, or substances such as fungicides, insecticides, or bactericides other than those agents discussed herein. Also, substances may be added to bring about various physical improvements such as prevention of lumping during storage, etc.

It is to be understood that the more particular description given above is by way of illustration, and that various modifications are possible and will occur to persons skilled in the art upon becoming familiar herewith. Accordingly, it is intended that the patent shall cover, by suitable expression in the claims, the features of patentable novelty which reside in the invention.

I claim:

1. A composition prepared for use in combating fungi and insects, comprising a surface active agent, and at least one monocyclic unsaturated five-membered carbocyclic compound containing the molecular fragment defined by

wherein C is a nuclear carbon atom; wherein $n$ represents an integer from 1 to 2; wherein $Q_1$ represents the grouping =C=O of which C is a nuclear carbon atom; wherein $Q_2$ represents an unsaturated group selected from the class consisting of

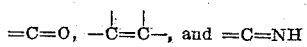

in which unsaturated grouping selected from said class each C is a nuclear carbon atom, and wherein the remaining valences on the five-membered carbocyclic ring which are not a part of said molecular fragment are satisfied by at least one of the group consisting of hydrogen, oxygen, chlorine, alkyl, chlorinated alkyl, alkenyl, chlorinated alkenyl, alkylidene and chlorinated alkylidene, said composition forming an emulsion with water upon agitation therewith.

2. A composition prepared for use in combating fungi and insects, comprising a surface active agent and 3,4,5-trichloro-3-cyclopentene-1,2-dione, said composition forming an emulsion with water upon agitation therewith.

3. A composition prepared for use in combating fungi and insects, comprising a surface active agent and 2,5-dichloro-4-cyclopentene-1,3-dione, said composition forming an emulsion with water upon agitation therewith.

4. A composition prepared for use in combating fungi and insects, comprising a surface active agent and 2,5-dichloro-4-cyclopentene-3-imine-1-one, said composition forming an emulsion with water upon agitation therewith.

5. A composition prepared for use in combating fungi and insects, comprising a surface active agent and tetrachloro-4-cyclopentene-1,3-dione, said composition forming an emulsion with water upon agitation therewith.

6. A composition prepared for use in combating fungi and insects, comprising a surface active agent and hexachloro-3-cyclopentene-1-one, said composition forming an emulsion with water upon agitation therewith.

7. A process for protecting a material from attack by one of the group consisting of fungi and insects, comprising applying to said material an effective amount of at least one monocyclic unsaturated five-membered carbocyclic compound containing the molecular fragment defined by

wherein C is a nuclear carbon atom; wherein $n$ represents an integer from 1 to 2; wherein $Q_1$ represents the grouping =C=O of which C is a nuclear carbon atom; wherein $Q_2$ represents an unsaturated grouping selected from the class consisting of

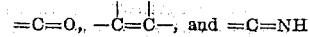

in which unsaturated grouping selected from said class each C is a nuclear carbon atom, and wherein the remaining valences on the five-membered carbocyclic ring which are not a part of said molecular fragment are satisfied by at least one of the group consisting of hydrogen, oxygen, chlorine, alkyl, chlorinated alkyl, alkenyl, chlorinated alkenyl, alkylidene and chlorinated alkylidene.

8. A process for protecting material from attack by one of the group consisting of fungi and insects, comprising applying to said material an effective amount of 3,4,5-trichloro-3-cyclopentene-1,2-dione.

9. A process for protecting material from attack by one of the group consisting of fungi and insects, comprising applying to said material an effective amount of 2,5-dichloro-4-cyclopentene-1,3-dione.

10. A process for protecting material from attack by one of the group consisting of fungi and insects, comprising applying to said material an effective amount of 2,5-dichloro-4-cyclopentene-3-imine-1-one.

11. A process for protecting material from attack by one of the group consisting of fungi and insects, comprising applying to said material an effective amount of tetrachloro-4-cyclopentene-1,3-dione.

12. A process for protecting material from attack by one of the group consisting of fungi and insects, comprising applying to said material an effective amount of hexachloro-3-cyclopentene-1-one.

13. A process for destroying one of the group consisting of fungi and insects which comprises exposing the same to a lethal concentration of at least one monocyclic unsaturated five-membered carbocyclic compound containing the molecular fragment defined by

wherein C is a nuclear carbon atom; wherein $n$ represents an integer from 1 to 2; wherein $Q_1$ represents the grouping =C=O of which C is a nuclear carbon atom; wherein $Q_2$ represents an unsaturated grouping selected from the class consisting of

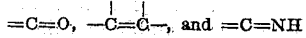

in which unsaturated grouping selected from said class each C is a nuclear carbon atom, and wherein the remaining valences on the five-membered carbocyclic ring which are not a part of said molecular fragment are satisfied by at least one of the group consisting of hydrogen, oxygen, chlorine, alkyl, chlorinated alkyl, alkenyl, chlorinated alkenyl, alkylidene and chlorinated alkylidene.

References Cited in the file of this patent
UNITED STATES PATENTS

| Re. 22,597 | Ladd | Jan. 30, 1945 |
| 2,362,594 | ter Horst | Nov. 14, 1944 |
| 2,378,597 | ter Horst | June 19, 1945 |
| 2,548,509 | Yowell | Apr. 10, 1951 |